(12) United States Patent
Haldar (10) Patent No.: US 8,244,810 B1
(45) Date of Patent: Aug. 14, 2012

(54) SYSTEM AND METHOD FOR MERGING INSTANT MESSAGES

(75) Inventor: Debashis Haldar, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 3083 days.

(21) Appl. No.: 10/350,176

(22) Filed: Jan. 23, 2003

(51) Int. Cl.
*G06F 15/16* (2006.01)
(52) U.S. Cl. ...................................................... 709/206
(58) Field of Classification Search ................... 709/206
See application file for complete search history.

(56) References Cited

U.S. PATENT DOCUMENTS

| | | | | |
|---|---|---|---|---|
| 6,735,634 | B1 * | 5/2004 | Geagan et al. | 709/235 |
| 6,775,689 | B1 * | 8/2004 | Raghunandan | 709/206 |
| 2002/0198939 | A1 * | 12/2002 | Lee et al. | 709/203 |
| 2003/0101227 | A1 * | 5/2003 | Fink | 709/207 |
| 2003/0135569 | A1 * | 7/2003 | Khakoo et al. | 709/206 |

OTHER PUBLICATIONS

Campbell, et al., "Session Initiation Protocol (SIP) Extension for Instant Messaging", ftp://ftp.rfc-editor.org/in-notes/rfc3428.txt, pp. 1-17, printed from World Wide Web on Apr. 23, 2003.
Campbell, et al., "Session Initiation Protocol Extension for Instant Messaging draft-ietf-sip-message-07", ftp://ftp.rfc-editor.org/internet-drafts/draft-ietf-sip-message-07.txt, pp. 1-21, printed from World Wide Web on Sep. 24, 2002.

* cited by examiner

*Primary Examiner* — Larry Donaghue (57) ABSTRACT

An instant message delivery system includes a network node with a packet queue. The packet queue stores packets containing instant messages. When the system detects network congestion, it merges two or more packets where possible to make a single packet. In particular, when two or more data packets contain instant messages with the same recipient, the system merges the data packets into a single data packet with multiple instant messages. When two or more data packets have instant messages with the same recipient and the same sender, the system merges the data packets into a single data packet and further merges the instant messages into a single instant message containing more than one message body.

4 Claims, 6 Drawing Sheets

SYSTEM AND METHOD FOR MERGING INSTANT MESSAGES

BACKGROUND OF THE INVENTION

1. Field of the Invention

The present invention relates to the delivery of instant messages over a network.

2. Description of Related Art

Instant messaging is an increasingly popular form of communication, at least in part because of the convenience of instantaneous transmission of messages. However, as that popularity increases—along with the popularity of other forms of digital communication that may share the same communication channels, network congestion increasingly tends to slow the delivery of instant messages or even to prevent delivery altogether, thereby defeating one of the key advantages of instant messaging.

One common method of sending instant messages is through the use of SIP (Session Initiation Protocol) messages at the application layer and UDP (User Datagram Protocol) packets at the transport layer. SIP is described in, for example, IETF RFC-3261 (June 2002). One method used in SIP is the SIP "MESSAGE" method, in which requests of the type "MESSAGE" are used as instant messages to convey message bodies, such as text, between communicants. The MESSAGE method is described in the Internet Draft "Session Initiation Protocol Extension for Instant Messaging" (Sep. 14, 2002), available from the Internet Engineering Task Force (IETF). UDP is described in, for example, RFC 768 "User Datagram Protocol" (Aug. 28, 1980).

Where an instant message is sent as an application layer packet, such as a SIP message, wrapped in a transport layer packet, such as a UDP packet, each message includes the data overhead of both a SIP packet header and a UDP packet header.

SUMMARY OF THE INVENTION

An instant message delivery system merges messages sent to a single user into a single transport layer packet and, where possible, into a single application layer packet. The system includes a network node with a packet queue. The packet queue stores packets containing instant messages received by the system until the packets can be forwarded to other network nodes or to the messages' final destinations. Packets received by the system are in the form of a data packet made up of a data header and an instant message. The instant message includes a recipient identifier, a sender identifier, and a message body. When the system detects network congestion, it merges two or more packets where possible to make a single packet. In particular, when two or more data packets contain instant messages with the same recipient, the system merges the data packets into a single data packet with multiple instant messages. When two or more data packets have instant messages with the same recipient and the same sender, the system merges the data packets into a single data packet and further merges the instant messages into a single instant message with multiple message bodies.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

Figure 1:
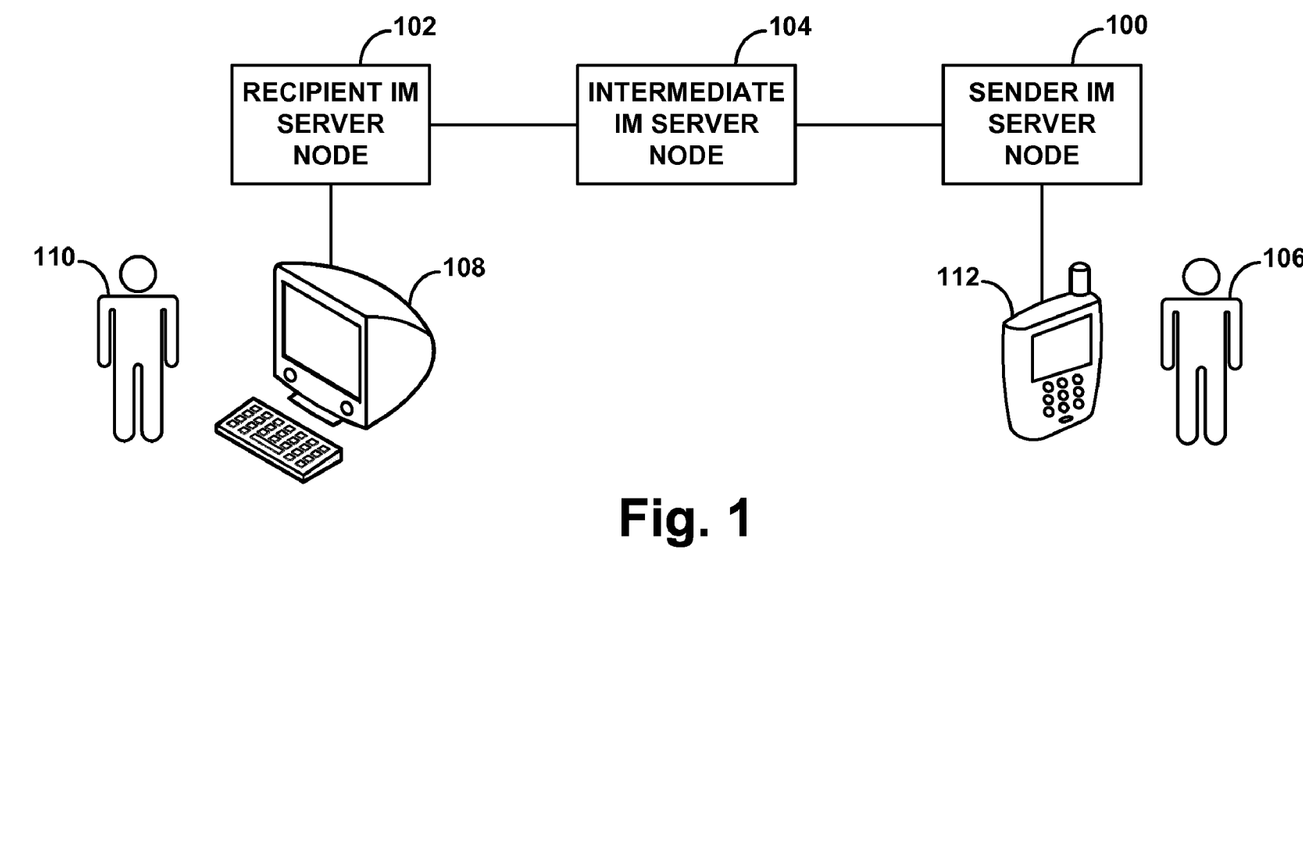
FIG. 1 is a schematic diagram of a network in which a system for merging instant messages can be implemented.

In an exemplary embodiment, a system for merging instant messages for delivery is implemented in a network, as illustrated in FIG. 1, that includes a first instant message server node 100 and a second instant message server node 102. Server nodes 100 and 102 communicate through a network that may include an intermediate network node 104. A sender 106 who subscribes to an instant messaging service offered by the first instant message server 100 enters an instant message on a user terminal 112, such as a mobile phone or alternative instant messaging terminal. The instant message is addressed to a recipient 110, who subscribes to an instant messaging service offered by the recipient's instant message server 102. The instant message is sent from the user terminal 112 to the sender's instant message server 100. The sender's instant message server sends the message through one or more intermediate network nodes such as network node 104 to the recipient's instant message server 102 and is then delivered to a user terminal 108, such as a personal computer, where it can be displayed for the recipient 110. The system may also be implemented where instant messages are distributed using a single server node.

The system for merging instant messages for delivery may be implemented in the sender's instant messaging server node 100, the intermediate network node 104, the recipient's instant messaging server node 102, and/or a different network node.

A system for merging instant messages for delivery operates by receiving data packets such as data packet 10 (FIG. 3) including a data header 12 and an instant message 14. The instant message 14 includes a recipient address field 16 that stores a recipient identifier, a sender address field 18 that stores a sender identifier, and a message body 15. The data packet 10 may include a transport-layer packet such as a UDP packet, in which case the data header 12 includes a destination port 20, a source port 22, a length field 24, and a checksum 26. Where the data packet 10 is a UDP packet, the instant message 14 makes up the "body" field of the UDP message. The UDP packet may itself be contained in one or more network-layer packets such as an Internet Protocol (IP) packets for transport over the network, as described in RFC 791 "Internet Protocol" (September 1981). In that event, an IP header 21 may be appended to the beginning of the data packet 10. An IP header 21 includes network addresses such as a source IP address 24 and a destination IP address 25. The destination IP address 25 specifies the network node to which the data packet 10 should be routed. Techniques other than the use of IP packets are known for transporting instant messages over a network and may alternatively be employed in this system.

Figure 3:
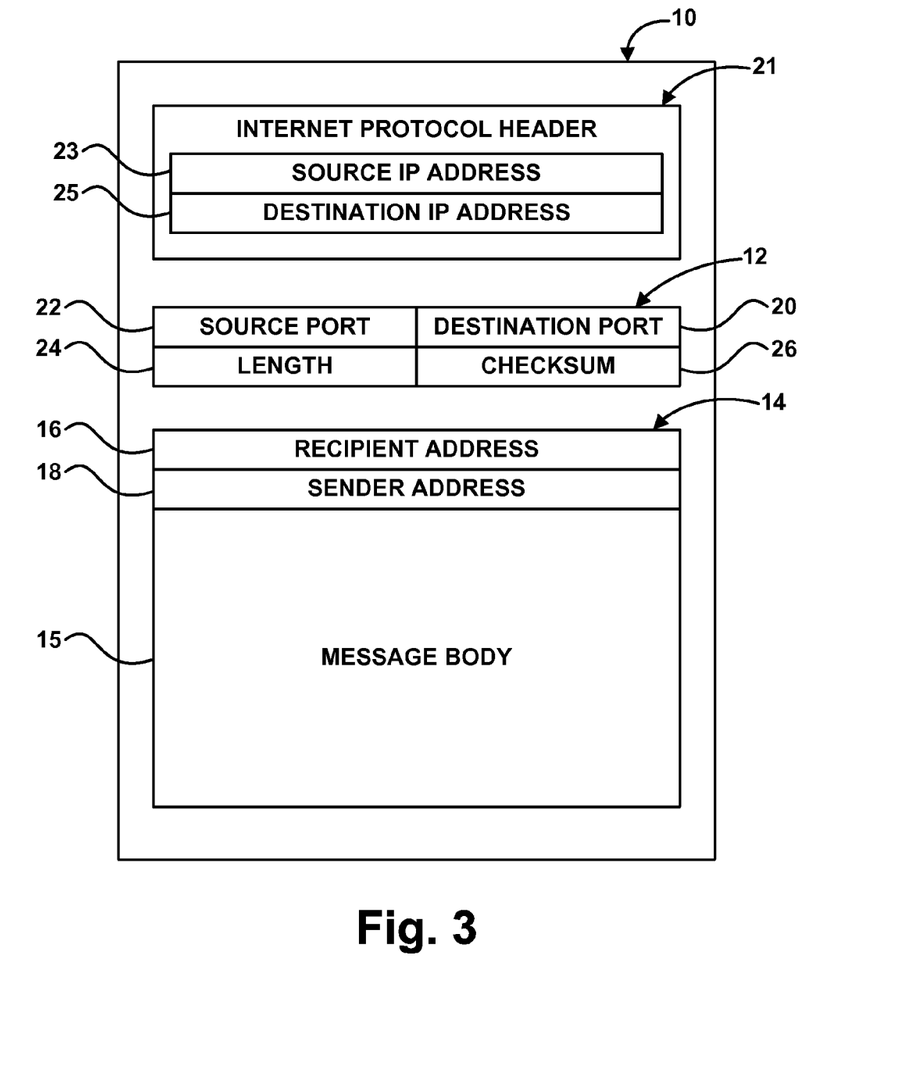
FIG. 3 is a schematic diagram of the contents of a data packet including an instant message.

An exemplary instant message 14 is an application-layer packet that includes a message header and a message body. The instant message 14 may be a SIP message of type "MESSAGE." In that case, the instant message 14 includes the recipient identifier 16 in a "To:" field and the sender identifier 18 in a "From:" field. The "To:" and "From:" fields are in a header of a SIP instant message. A "Content-type:" field in the header identifies the type of data sent in the message body. The message body may be a text message or an alternative message type, such as an image or audio message.

An exemplary instant message 14 in SIP "MESSAGE" format appears as follows:

MESSAGE sip:user2@domain2.com SIP/2.0
    Via:    SIP/2.0/TCP    user1pc.domain.com;
       branch=z9hGsgdkse
    From: sip:user1@domain1.com;tag=49583
    To: sip:user2@domain2.com
    Call-ID: asd88asd77a@1.2.3.4
    CSeq: 1 MESSAGE
    Content-Type: text/plain
    Content-Length: 18
    Watson, come here.

In this case, the sender identifier is one instant messaging inbox address, "user1@domain.com" and the recipient identifier is another instant messaging inbox address, "user2@domain.com". The media type is specified in the header as the MIME type "text/plain". The message body is in this example the eighteen characters of the text "Watson, come here."

An application-layer instant message 14 may take formats other than a SIP message, such as an XML message. The following exemplary XML message is sent by the same sender, addressed to the same recipient, and contains the same message body as in the previous example.

<message from='user1@domain1.com'
    to='user2@domain2.com'
    id='messageid2'
    type='normal'>
    <thread>threadid_02</thread>
    <subject>Spill</subject>
    <body>Watson, come here.</body>
    </message>

In this exemplary XML message, the sender identifier, recipient identifier, and message body are identical to those in the SIP message of the previous example. Other formats for sending instant messages may be employed in addition to the SIP and XML formats listed above.

In one method of merging data packets and/or instant messages, a system detects whether data packets contain instant messages with the same recipient and, if so, merges the data packets, so that a single data packet (such as a UDP packet) includes more than one instant message. If data packets are detected that contain instant messages that are sent to the same recipient and that were sent by the same sender, the system merges the data packet and the instant messages, so that a single instant message contains more than one message body.

The system may combine two or more message bodies into a single instant message, and it may combine two or more instant messages into a single data packet. When the system creates a merged data packet, it inserts the merged data packet in the packet queue and deletes the original packets from the queue. Although this merging operation is described herein by way of example as the creation of a new, merged data packet, the operation of creating a merged data packet does not exclude creating a merged data packet by modifying an incoming data packet and/or one of the data packets in the packet queue to form the merged instant message.

Because some types of data packets have a size limit set by protocol standards, the system may calculate the expected size of a merged data packet prior to creating a merged data packet. If the expected size exceeds the limit set by protocol standards or by other design choices, the system does not merge the packets. For example, a UDP packet cannot exceed approximately 64 k in size, so the system will not merge data packets when the resulting packet would exceed 64 k. A lower threshold may be chosen to accommodate network nodes that have smaller packet size limitations.

Preferably, but not necessarily, the system determines whether there is network congestion before merging data packets and, if no congestion exists, data packets are not merged. The system may detect congestion by counting the number of data packets in the packet queue. If the number of data packets in the packet queue reaches a threshold determined by design considerations, the system determines that there is network congestion. Such design considerations may include a comparison of the average amount of time it takes to send each data packet with the amount of processor time it takes to merge data packets. Preferably, the threshold is set such that any delay introduced by processor resources dedicated to merging data packets is more than offset by the performance increases caused by the reduction in the number of data packets due to merging. A packet queue length of thirty is one suggested threshold at which the system begins merging data packets. The system may employ alternative methods of determining whether network congestion exists, such as detecting a number of dropped data packets, measuring response times of nodes along the network, or other methods of congestion detection.

Preferably, when data packets are merged, the merged data packet has only one data packet header. Likewise, when instant messages are merged, the resulting merged instant message preferably includes only one instant message header. By eliminating excess headers, the system can reduce the total number of bits sent over the network.

A system that incorporates several of the features discussed above handles data packets according to Table 1, below:

TABLE 1

|  | Same Sender | Different Senders |
|---|---|---|
| Same Recipient | Merge UDP Packets<br>Merge SIP Messages | Merge UDP Packets |
| Different Recipient | No Merge | No Merge |

Figure 4:
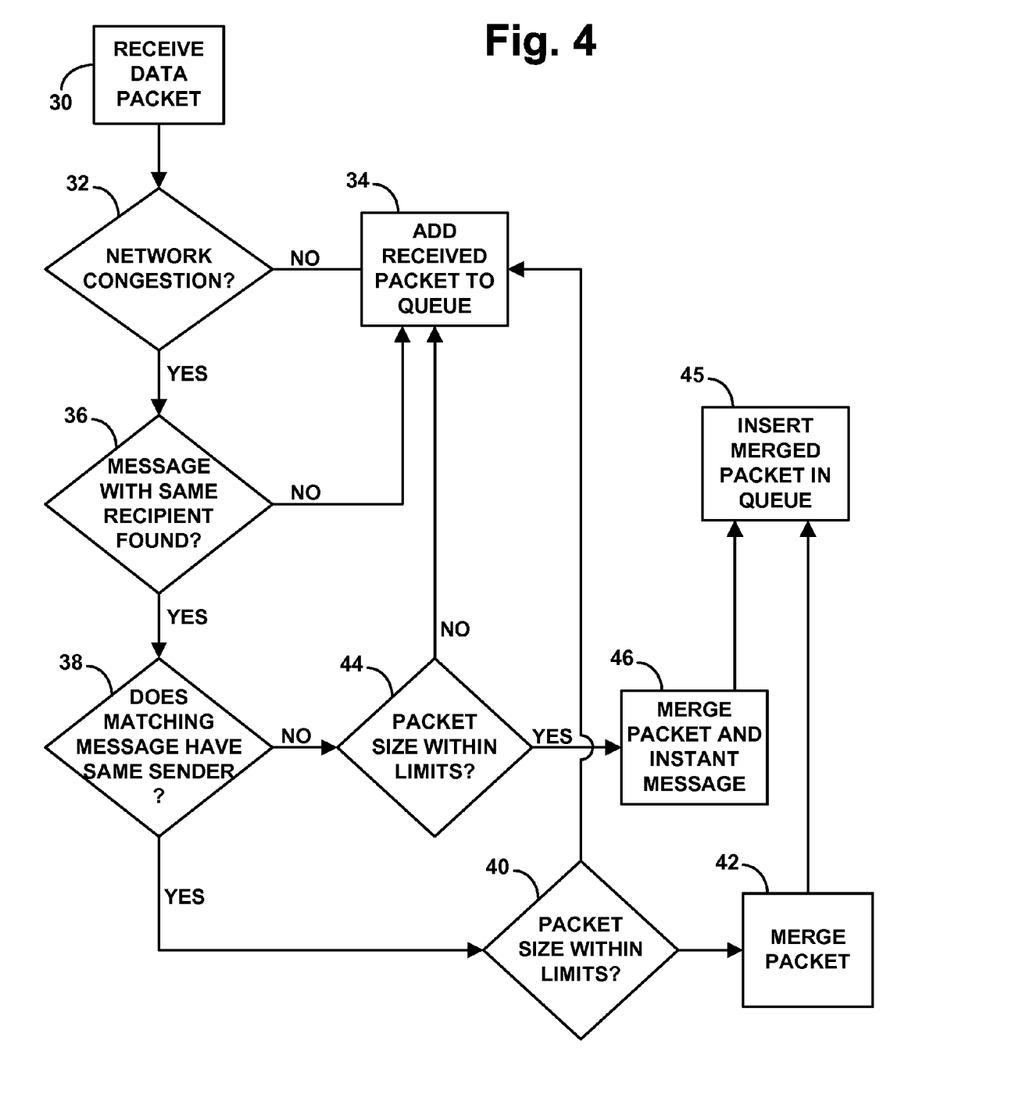
FIG. 4 is an exemplary flow chart illustrating a method of merging instant messages.

The operation of one such system is illustrated by the flow chart of FIG. 4. When a data packet is received by the system at step 30, the system detects at step 32 whether there is network congestion. If there is no network congestion, the received data packet is added to the packet queue in step 34. If there is network congestion, the system then searches through the packet queue at step 36 to test whether any message in the packet queue is addressed to the same recipient as the incoming message received at step 30. If no such message is identified, the received message is added to the packet queue at step 34. If a queued message is identified that has the same recipient as the incoming message, the system then tests at step 38 whether that matching message has the same sender as the incoming message.

If the system determines at step 38 that the queued message has the same recipient as the incoming message but does not have the same sender, the system determines at step 40 whether a merged data packet—containing separate instant messages from both the queued and incoming messages—would be within a size limit for data packets. If so, the system creates a merged data packet at step 42 and inserts the merged data packet in the packet queue at step 45. Preferably, the system inserts the merged data packet at the location in the queue originally occupied by the matching message in the packet queue and deletes the matching message, but the merged message could be inserted at an alternative location in the queue.

If, on the other hand the system determines at step 38 that the queued message has the same recipient as the incoming message and the same sender, the system determines at step 44 whether a merged data packet—containing a merged instant message with separate message bodies—would be within a size limit for data packets. If so, the system creates a merged data packet at step 46 that includes a merged instant message. The merged data packet with its merged instant message is then inserted at step 45 in the packet queue, preferably at the location originally occupied by the matching message in the packet queue, but the merged message could be inserted at an alternative location in the queue.

In one embodiment, the system determines whether instant messages have the same senders and/or same recipients by testing whether the sender identifiers and/or recipient identifiers are identical. The system may, determine that instant messages have the same senders and/or recipients even where the identifiers are not identical. For example, the system may make use of a database associating different identifiers, so that "user1@domain1.com" identifies the same user as "techsupport@domain1.com", or "user2" identifies the same user as "user2@domain2.com" when the sender is also located on "domain2.com". Other methods of testing for the same senders and/or recipients are also possible. Recipient identifiers are considered to be the same when they identify the same user, even though the identifiers themselves are not identical.

The steps illustrated by the flow chart of FIG. 4 may be modified by, for example, merging all data packets having the same recipient in a first pass through the packet queue and then, in a second pass through the packet queue, merging instant messages that have the same sender within each of the merged data packets. Likewise, in implementations in which instant messages are sent and stored as application layer packets but not encapsulated within transport layer packets, the system can still merge instant messages from the same sender sent to the same recipient.

In one embodiment of the invention, the system does not search for matching instant messages in the first several packets in the packet queue (i.e., the packets that are scheduled to be sent over the network first), up to a margin position in the queue. For example, if the margin is set to the fifth packet, the system does not search the first five messages in the queue. In this way, any processing delay introduced by the search for matching instant messages does not interfere with the prompt forwarding of those packets.

It is possible that, when the system first detects network congestion, matching messages may be present in the packet queue that have not been merged. In that case, the system might not only match messages in incoming data packets with messages in the queue, it might also search through the queue to match and merge messages already in the queue.

Merged data packets may take a variety of forms, depending in part on the format in which instant messages are sent. Preferably, a merged data packet has only one data header, and each instant message within the data packet has only one instant message header. Beginning and ending products of packet merging are schematically illustrated in FIGS. 5 and 6 by way of example.

Figure 5:
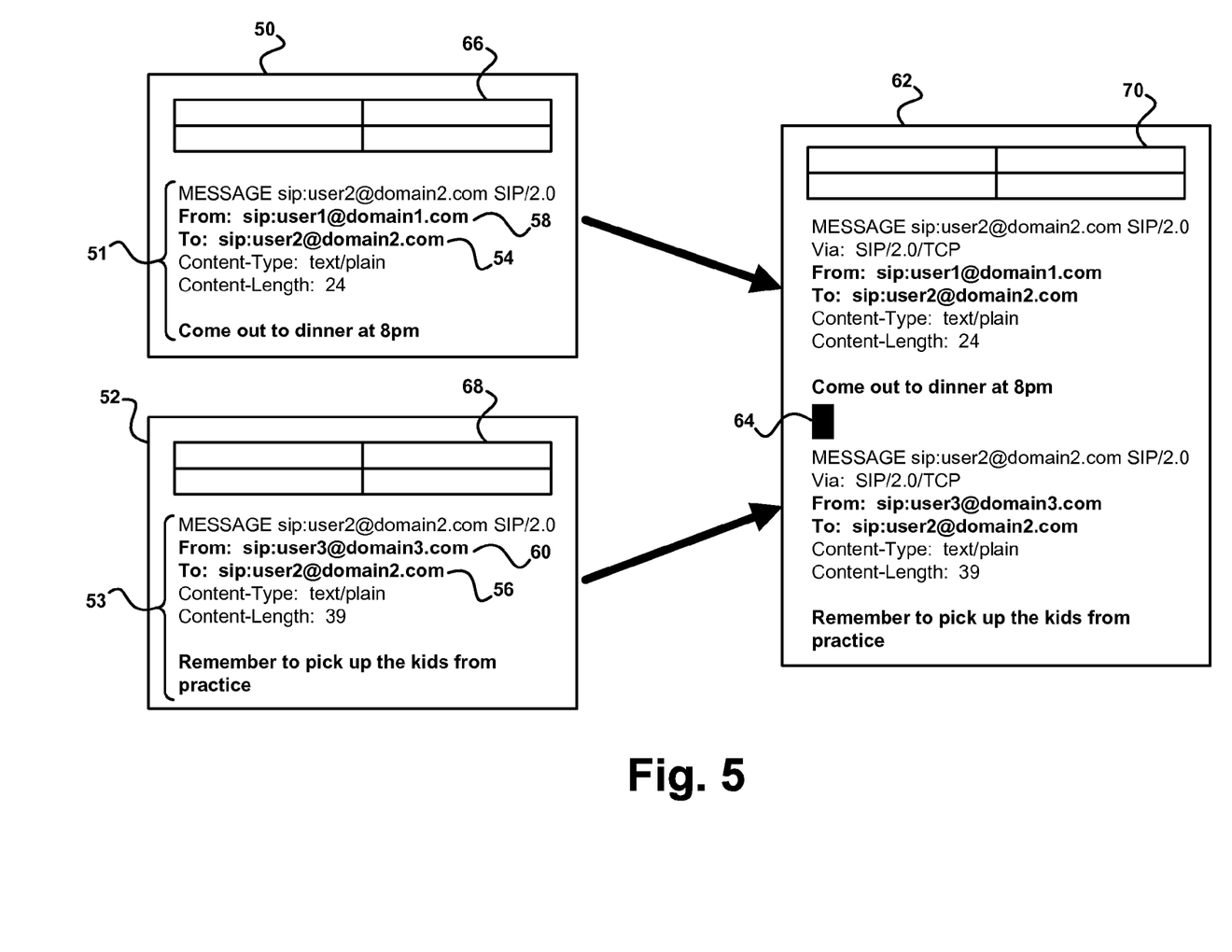
FIG. 5 schematically illustrates data packets before and creation of a merged data packet.

In FIG. 5 an incoming data packet 50 and a matching queued data packet 52 include, respectively, instant messages 51 and 53. The instant messages 51 and 53 include recipient identifiers 54 and 56 that address the same recipient at the address "user2@domain2.com". The two messages however, were sent by different senders: message 51 was sent from a user with the address "user1@domain1.com", as identified by the sender identifier 58, and message 53 was sent by a user with the address "user3@domain3.com", as identified by the sender identifier 56. As described above, the two data packets 50 and 52 are merged into a single data packet 62. A message delimiter 64, such as a special character or series of characters, is optionally inserted between the two instant messages within the data packet 62. In this exemplary embodiment, each data packet 50, 52 has its own data header 66, 68, whereas the merged packet 62 has only a single data packet header 70. As an alternative, the message delimiter 64 may be positioned elsewhere in the message. For example, the message delimiter may be a data field with one or more integral values that indicate the starting points of the messages. Where merged packet 62 is a UDP packet, the contents of header 70 of the merged data packet follow the standards for the UDP protocol and may be, for example, a modified version of header 66 or header 68 that has been changed to reflect different length and different checksum values.

Figure 6:
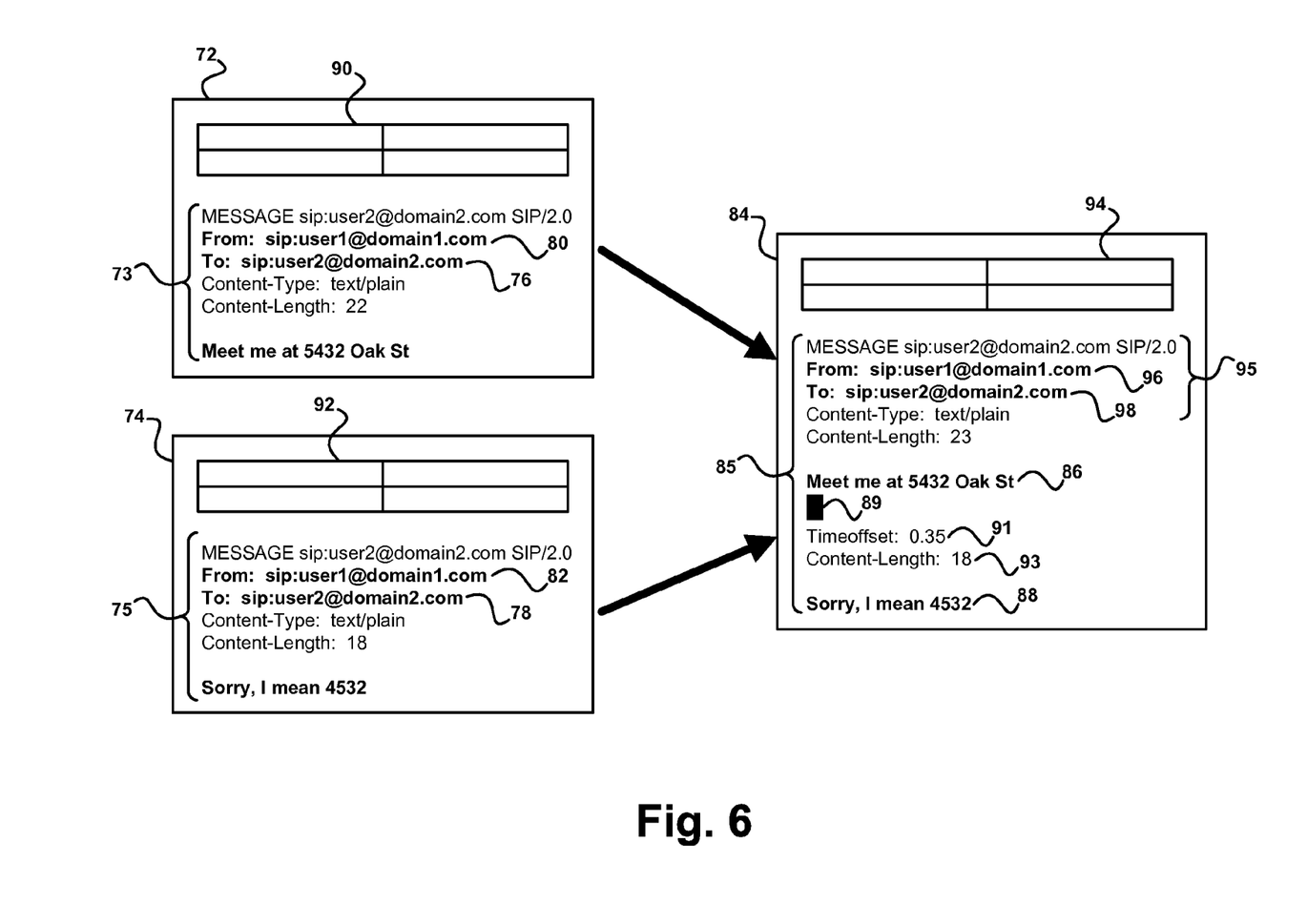
FIG. 6 schematically illustrates data packets before and after creation of a merged data packet.

In FIG. 6, an incoming data packet 74 and a matching queued data packet 72 include, respectively, instant messages 75 and 73 that both specify the same recipient 76, 78, in this case the recipient identified by "user2@domain2.com". Moreover, the messages 73 and 75 both specify the same sender 80, 82, in this case, the sender identified by "user1@domain1.com". As described above, the two packets 72, 74 are merged into a single merged packet 84. The merged packet 84 includes a merged instant message 85. The merged message 85 contains a message body 86 from the matching queued message 73 and another message body 88 from the incoming message 75. A delimiter code 89, such an unprintable character or string of characters, may optionally be inserted between the two message bodies.

In this exemplary embodiment, each data packet 72, 74 has its own data header 90, 92, whereas the merged packet 84 has only a single data packet header 94. Where the merged packet 84 is a UDP packet, the contents of the header 94 of the merged data packet follow the standards for the UDP protocol and may be, for example, a modified version of the unmerged headers 90 and/or 92 that has been changed to reflect different length and different checksum values. Moreover, the merged data packet 84 preferably includes only a single merged instant message header 95, with a single copy of the sender identifier 96 and the recipient identifier 98.

The merged packet 84 may include additional information such as a time offset field 91 to indicate the amount of time that lapsed between the sending of the queued message 73 and the sending of the incoming message 75. The merged packet 84 may also include additional information such as a content-length field 93 to identify the length of message body 88, or other information that is not redundant with the information in the merged data header 95.

The merged instant message 85 may take a form similar to SIP messages of type "MESSAGE" but may contain elements, such as the delimiter 89 or the additional fields 91, 93 that are not accommodated under SIP standards. Similarly, although the instant messages in the merged data packet 62 (FIG. 5) may follow SIP standards, it is not the usual practice to include more than one instant message in a single UDP packet. For that reason, implementation of some embodiments of the system would require the intended recipient of the instant messages to parse merged messages into their component messages, which may readily be performed by reference to the delimiter codes 64 or 89 or by other means.

Figure 2:
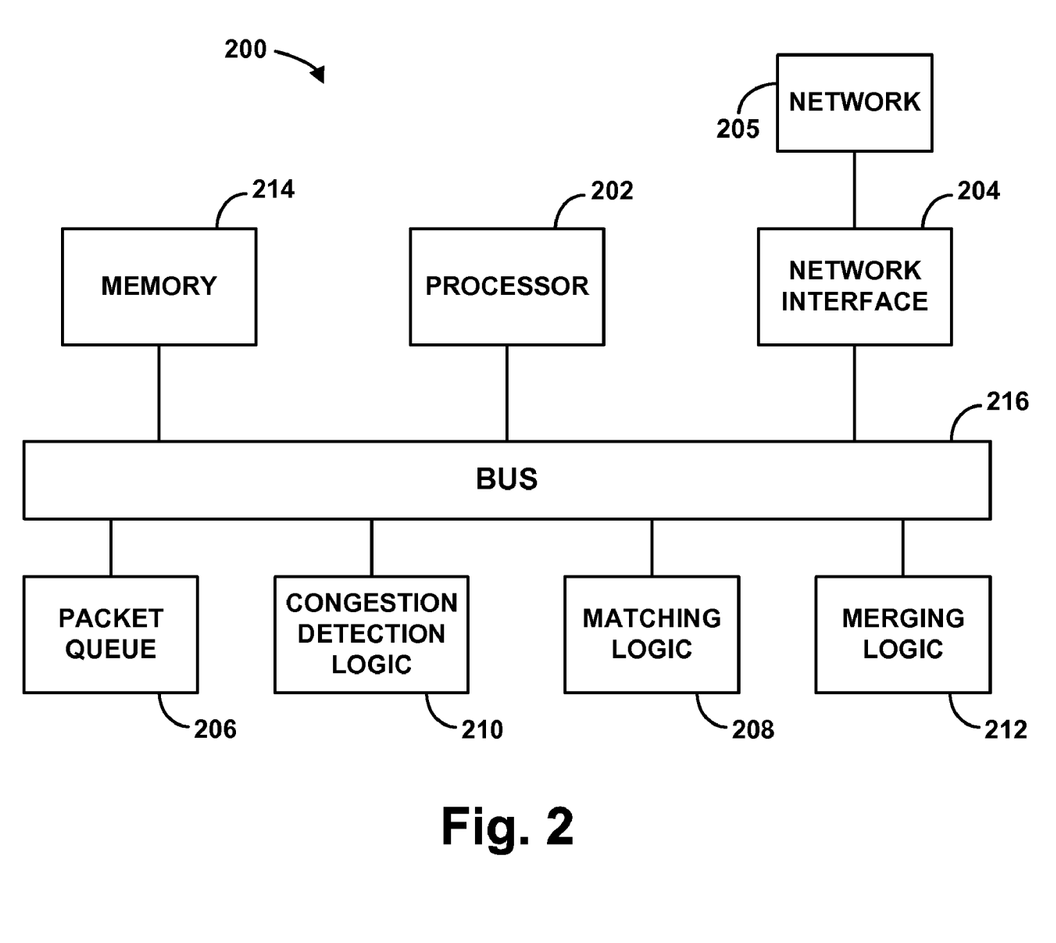
FIG. 2 is a block diagram of the architecture of a system for merging instant messages.

FIG. 2 depicts one exemplary system 200 for merging instant messages for delivery. As illustrated in FIG. 2, the system 200 includes one or more processors 202, a network interface 204 to a network 205, and a packet queue 206. The network interface 204 includes logic for receiving data packets that include instant messages. The packet queue 206 receives incoming messages and stores the messages until they can be forwarded to a different network node or to the message's final destination at a user terminal, such as terminal 108 or 112.

The system 200 also includes a packet queue 206 for storing data packets that include instant messages until those data packets can be forwarded over the network 205. The system further includes congestion detection logic 210 for determining when there is network congestion. The congestion detection logic 210 may interface with the packet queue 206 to determine that network congestion exists when the packet queue 206 exceeds a particular size. The matching logic 208 is provided to search through the packet queue 206 to determine whether queued packets have the same recipient as incoming packets and/or other queued packets. The matching logic 208 may also search through the packet queue 206 to determine whether any of the matching packets that have the same recipient also have the same sender. When the matching logic 208 determines that matching packets exist, merging logic 212 creates a merged packet and inserts the merged packet in the packet queue 206.

The various components of the system 200 may communicate over a bus interface 216, as illustrated in FIG. 2, or they may, for example, be implemented using different computers communicating by an alternative digital interface, such that the processor 202 should be construed to include multiple processors. The congestion detection logic 210, matching logic 208, merging logic 212, and software components of the network interface 204 may be implemented as machine language instructions stored in a computer memory 214 and executed by the processor 202. The packet queue 206 may likewise be implemented in the same computer memory 214 or in a different memory location.

Exemplary embodiments of the present invention are described above. Those skilled in the art will understand, however, that changes and modifications may be made to this embodiment without departing from the true scope and spirit of the present invention as defined by the following claims.

The invention claimed is:

1. A method of merging instant messages for delivery, comprising:
    receiving at a server including a packet queue a first data packet comprising a first data header and a first instant message, the first instant message including a first recipient identifier and first message body;
    identifying, in the packet queue, a second data packet comprising a second data header and a second instant message, the second instant message including a second recipient identifier and a second message body, in which the second recipient identifier is the same as the first recipient identifier; and
    creating a merged data packet, the merged data packet including a third data header, the first message body, and the second message body, wherein the merged instant message includes a time offset representing a difference between time at which the first instant message was sent and a time at which the second instant message was sent.

2. A method of merging instant messages for delivery, comprising:
    receiving at a server including a packet queue a first data packet comprising a first data header and a first instant message, the first instant message including a first recipient identifier and first message body;
    identifying, in the packet queue, a second data packet comprising a second data header and a second instant message, the second instant message including a second recipient identifier and a second message body, in which the second recipient identifier is the same as the first recipient identifier; and
    creating a merged data packet, the merged data packet including a third data header, the first message body, and the second message body,
    the method further comprising determining that the merged data packet would not exceed a data packet size limit, and creating the merged data packet only after determining that the merged data packet would not exceed the data packet size limit.

3. A method of merging instant messages for delivery, comprising:
    receiving at a server including a packet queue a first data packet comprising a first data header and a first instant message, the first instant message including a first recipient identifier and first message body;
    identifying, in the packet queue, a second data packet comprising a second data header and a second instant message, the second instant message including a second recipient identifier and a second message body, in which the second recipient identifier is the same as the first recipient identifier; and
    creating a merged data packet, the merged data packet including a third data header, the first message body, and the second message body,
    wherein the first instant message includes a first sender identifier and the second instant message includes a second sender identifier, the method further comprising (a) testing whether the second sender identifier is the same as the first sender identifier and (b) after a determination that the second sender identifier is the same as the first sender identifier, creating a merged instant message that includes (i) a third sender identifier that is the same as the first sender identifier, (ii) the first message body, and (iii) the second message body, and
    the method further comprising determining that the merged data packet would not exceed a data packet size limit, and creating the merged data packet only upon determining that the merged data packet would not exceed a data packet size limit.

4. A method of merging instant messages for delivery, comprising:
    receiving at a server including a packet queue a first data packet comprising a first data header and a first instant message, the first instant message including a first sender identifier, a first recipient identifier, and a first message body;
    identifying, in the packet queue, a second data packet comprising a second data header and a second instant message, the second instant message including a second sender identifier, a second recipient identifier, and a second message body, in which the second sender identifier is the same as the first sender identifier and the second recipient identifier is the same as the first recipient identifier; and
    after identification of the second data packet, creating a merged data packet that includes a third data header and a merged instant message, the merged instant message including a third recipient identifier that is the same as the first recipient identifier, a third sender identifier that is the same as the first sender identifier, the first message body, and the second message body,
    wherein the first instant message includes a first time code, the second instant message includes a second time code, and the merged instant message includes a time offset representing the difference between the first and second time codes.

* * * * *